Sept. 15, 1936.　　　B. E. OHLSON　　　2,054,267
APPARATUS FOR BALANCING ROTATABLE BODIES
Filed April 14, 1933　　　5 Sheets-Sheet 1
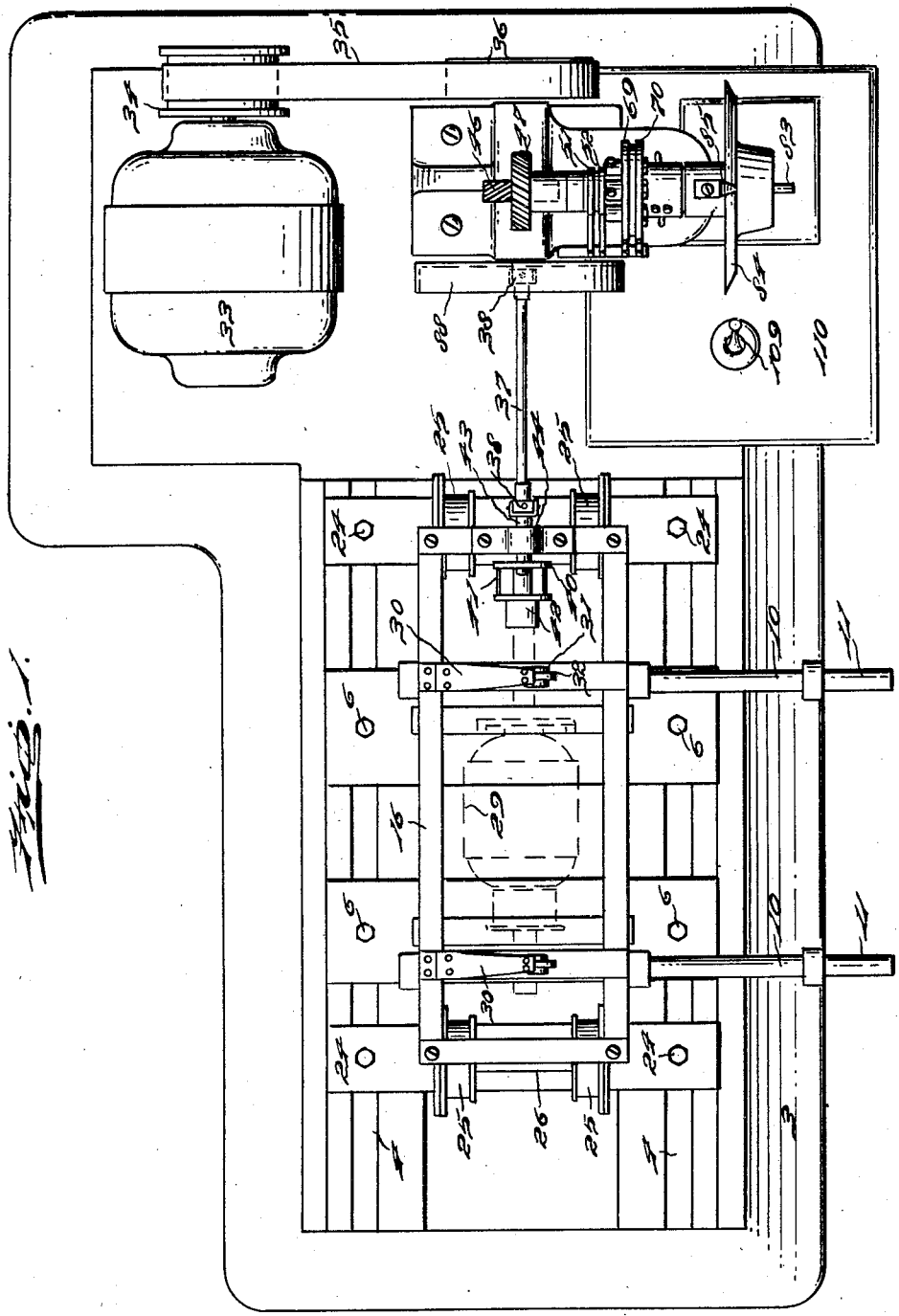
INVENTOR
Bengt Erik Ohlson
BY
Herbert S. Fairbanks
ATTORNEY

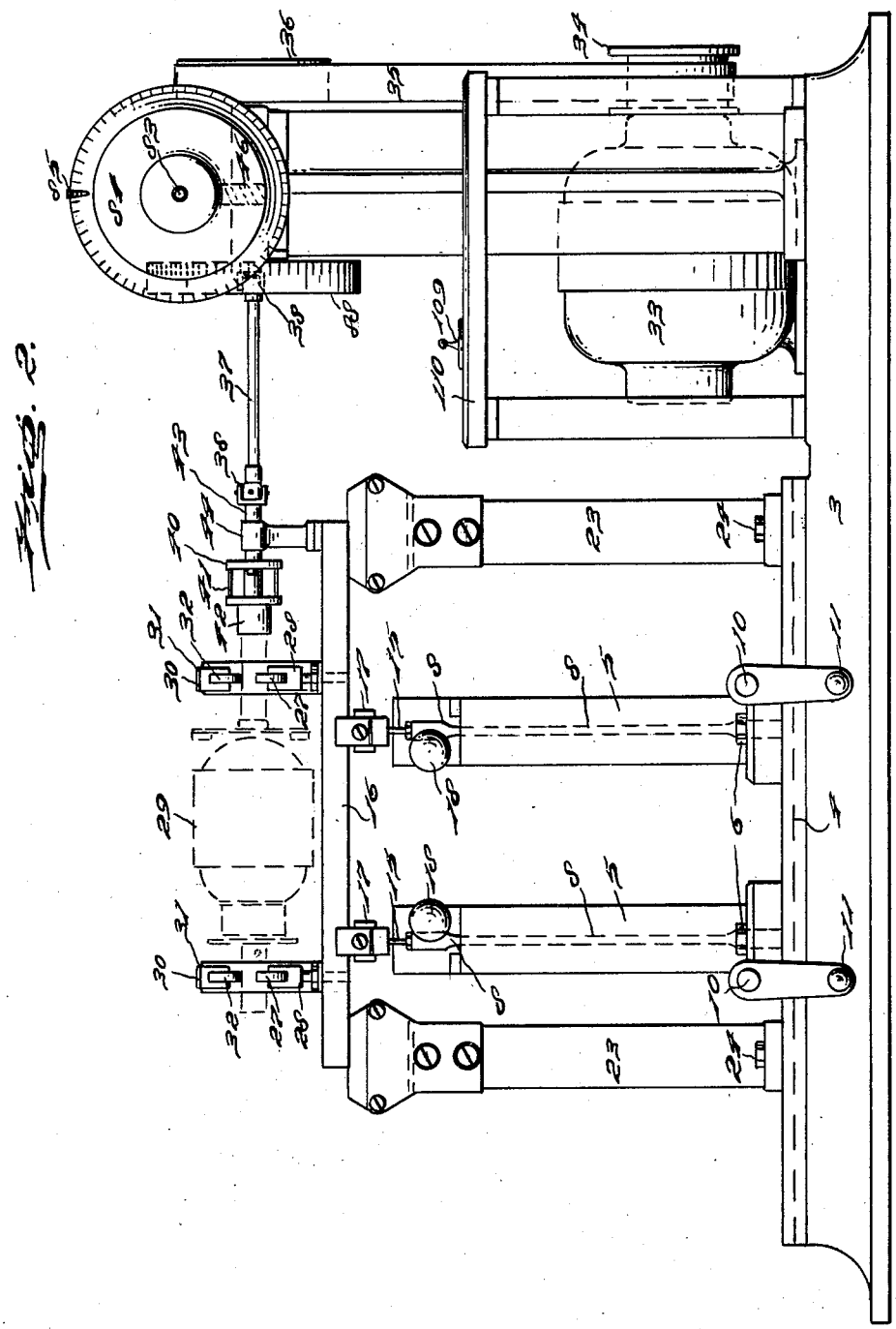

Sept. 15, 1936.  B. E. OHLSON  2,054,267
APPARATUS FOR BALANCING ROTATABLE BODIES
Filed April 14, 1933   5 Sheets-Sheet 3
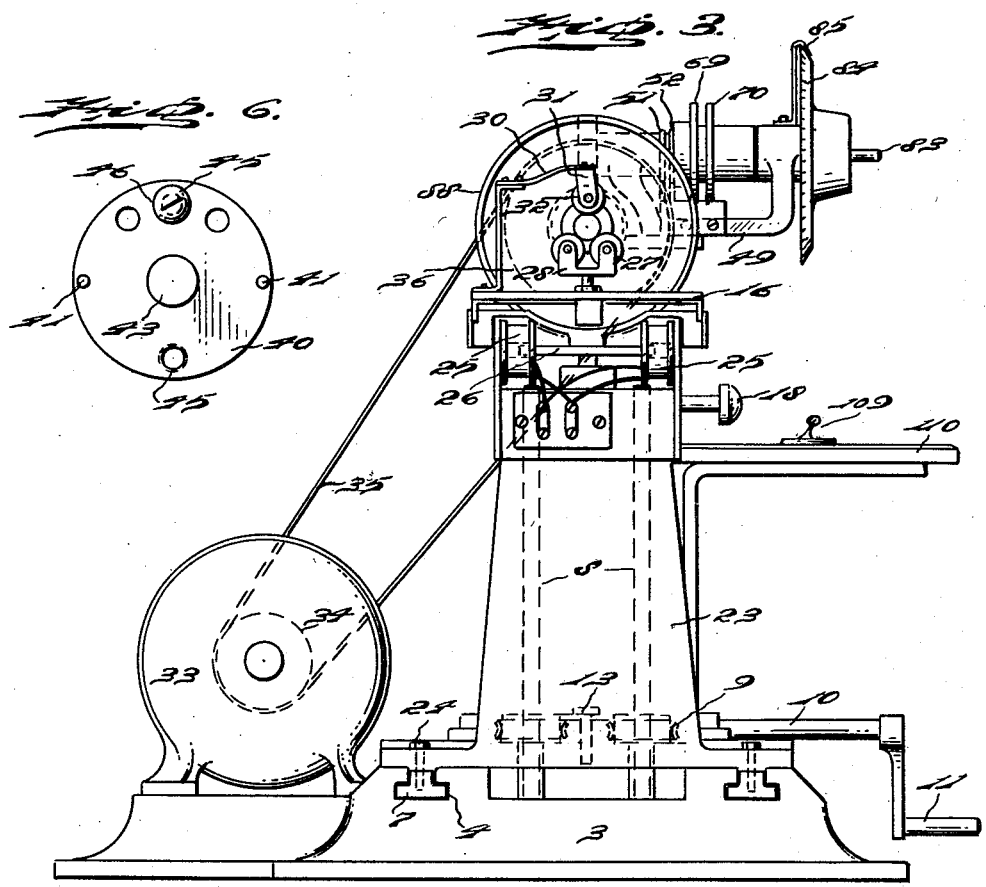
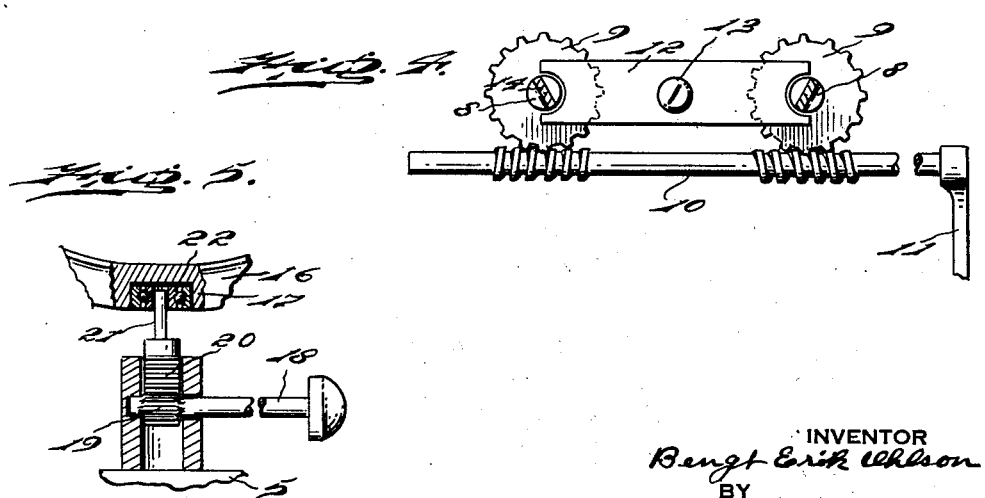
INVENTOR
Bengt Erik Ohlson
BY
Herbert S. Fairbanks
ATTORNEY Sept. 15, 1936.  B. E. OHLSON  2,054,267
APPARATUS FOR BALANCING ROTATABLE BODIES
Filed April 14, 1933  5 Sheets-Sheet 4
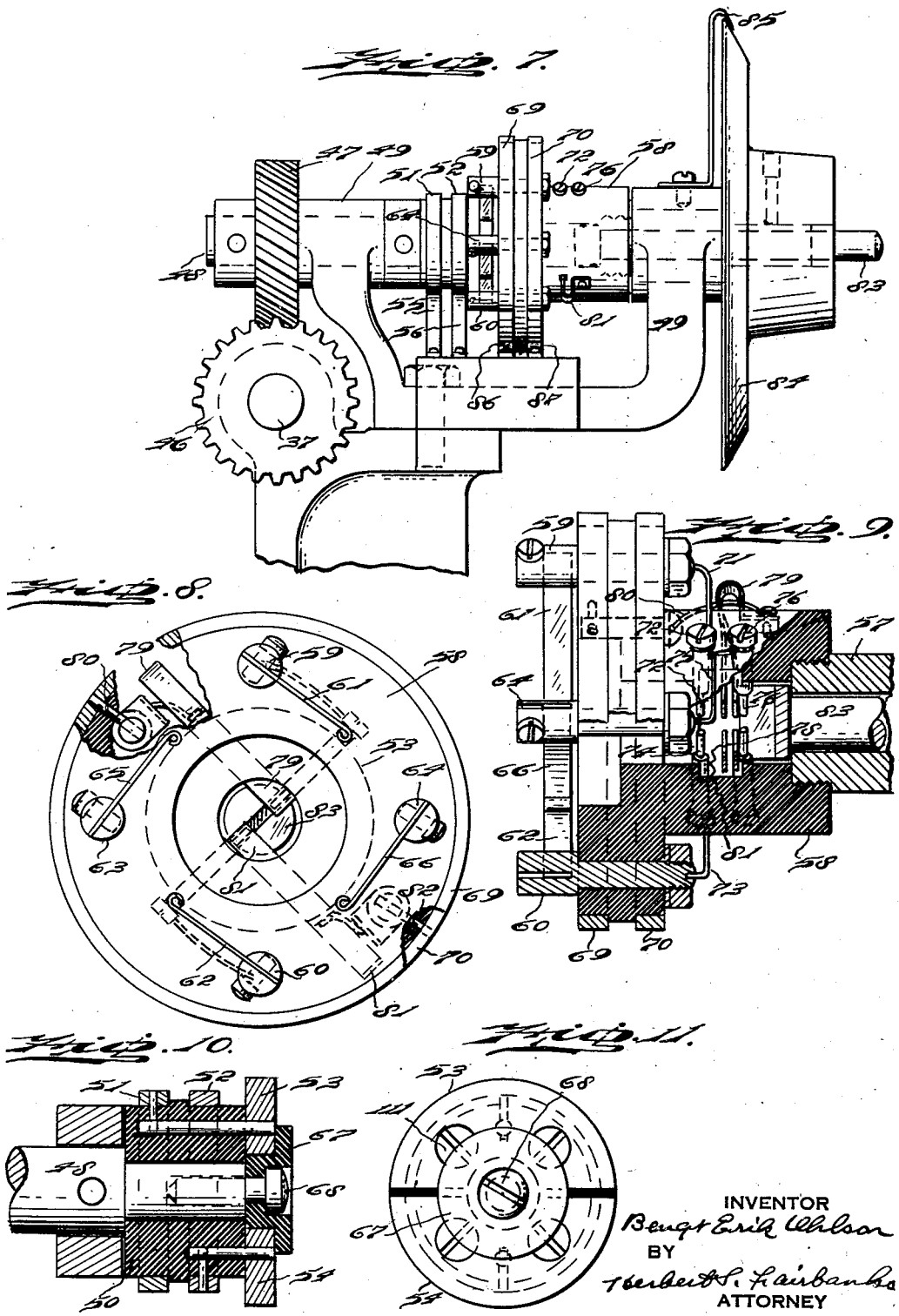
INVENTOR
Bengt Erik Ohlson
BY
Herbert P. Fairbanks
ATTORNEY

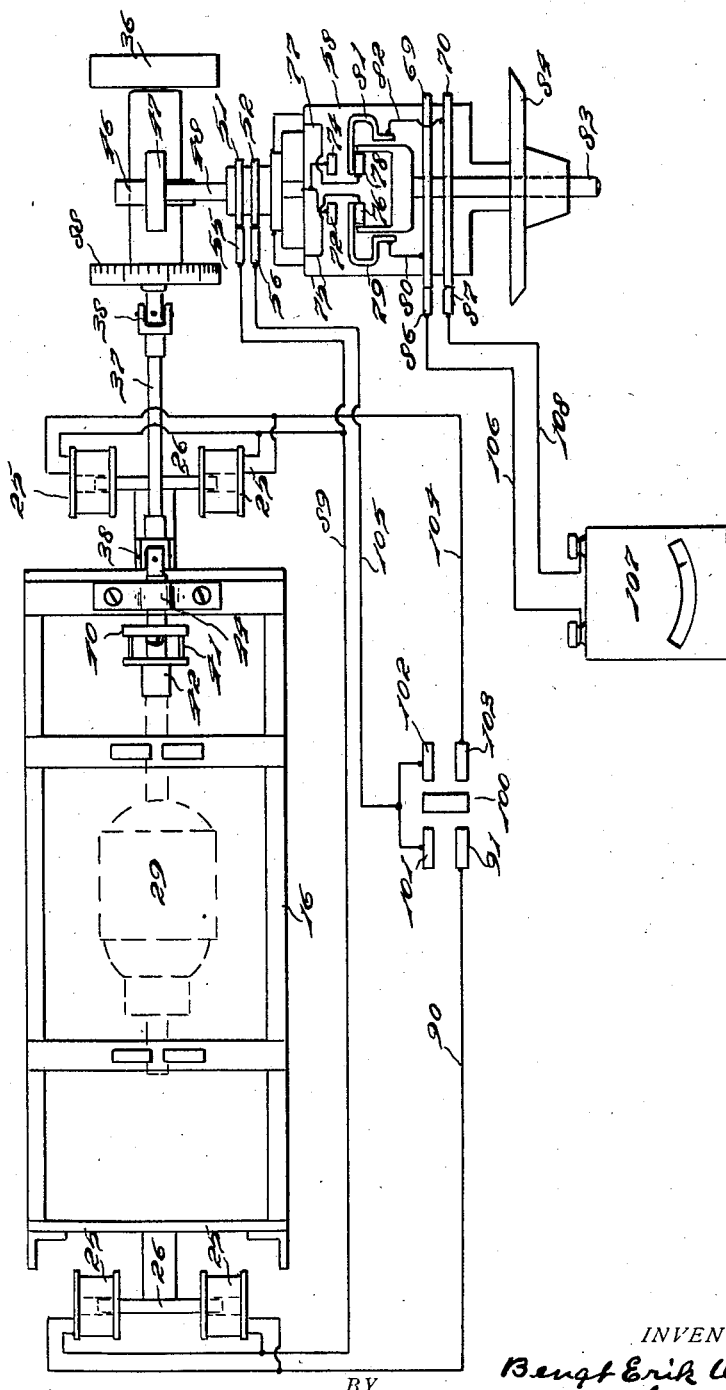

Patented Sept. 15, 1936

2,054,267

UNITED STATES PATENT OFFICE 2,054,267

APPARATUS FOR BALANCING ROTATABLE BODIES

Bengt Erik Ohlson, Philadelphia, Pa., assignor to Tinius Olsen Testing Machine Company, Philadelphia, Pa., a corporation of Pennsylvania Application April 14, 1933, Serial No. 666,085

11 Claims. (Cl. 73—51)

The object of this invention is to devise a novel apparatus for balancing rotatable bodies wherein the vibration due to unbalance is converted into electrical energy. The amount of unbalance is visibly indicated on an electric meter, and the angle of unbalance is visibly indicated on an angle indicator.

In carrying out my novel method, the amount of unbalance is determined by measuring the induced current created by relative movement, due to unbalance of the body being tested, of a magnet and solenoids.

The amount of unbalance is determined by the amplitude of a vibratory frame on which the body is revolving. The purpose of varying the natural period of vibration is to accommodate the machine for bodies of different weights, or for equalizing the vibrations at each end so that the register of unbalance can be read on the same scale.

The balancing machine is run at a constant speed and the angle and amount of unbalance may be taken at a period of vibration either above, in, or below the critical speed, provision being made for changing the natural period of vibration of the vibratory system while the driving motor is running at a constant speed.

With the above and other objects in view, as will hereinafter fully be set forth, my invention comprehends a novel apparatus for balancing rotatable bodies.

It further comprehends a novel method of and apparatus for balancing wherein the vibrations due to unbalance are converted into electrical energy and the amount of unbalance visibly indicated on a meter.

It further comprehends a novel apparatus for balancing wherein the vibrations due to unbalance are utilized to induce a current by causing relative movement between a magnet and solenoids, and measuring such induced current to determine the amount of unbalance.

It further comprehends novel means for changing the natural period of vibration while the machine is running.

It further comprehends a novel apparatus for determining the angle of unbalance of a rotatable body by relative adjustment of the position of brushes to a commutator driven at the same speed as the body to be balanced or at a fixed relative speed.

Other novel features of construction and advantage will hereinafter appear in the detailed description and the appended claims.

For the purpose of illustrating the invention, I have shown in the accompanying drawings a typical embodiment of it, which, in practice, will give satisfactory and reliable results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a top plan view of a balancing machine embodying my invention.

Figure 2 is a side elevation of the balancing machine.

Figure 3 is an end elevation of the balancing machine.

Figure 4 is a sectional plan view showing more particularly the vibratory rods and the manner in which they are adjusted to vary the periods of vibration.

Figure 5 is a sectional detail showing the manner of locking the vibratory frame.

Figure 6 is an end elevation of a calibrating drive member.

Figure 7 is a side elevation of the angle indicating mechanism.

Figure 8 is an end elevation showing the brush arrangement of the commutator.

Figure 9 is a side elevation, partly in section of the commutator mechanism.

Figure 10 is a sectional elevation of one of the commutators.

Figure 11 is an end elevation of the commutator seen in Figure 10.

Figure 12 is a wiring diagram.

Referring to the drawings:

The base 3 has opening through its upper face inverted T shaped guide slots 4. Standards 5 are longitudinally adjustable on the base and are provided with base plates which are fixed in the positions to which they have been adjusted by set screws 6 which engage T shaped shoes 7 slidable in the guide slots 4. The standards 5 are chambered to provide for the free and unobstructed vibration of flexible rods 8. These rods are rounded at their lower ends and are rotatably mounted in the base plates of the standard. The rods are arranged in sets, each set consisting of a pair of rods. Each rod of a set has mounted on it a worm gear 9 one of which has its teeth directed in a right hand direction, while the other gear of such set has its teeth directed in a left hand direction. The front and rear worm gears of a set mesh with a worm shaft 10 provided with an actuating handle 11 so that by turning the shaft 10 the natural period of vibration of the rods of a set may be varied. A spring 12 has its free ends bearing down upon the worm gears of a set and this spring is secured to its standard by a fastening device 13. The rods are thinned down intermediate their ends to render them more flexible and have the form of flat bands as shown at 14, see Figure 4. The vibration rods 8 have secured to their upper ends the rods 15 which are more flexible than the rods 8, and these rods 15 are rotatably secured to a vibratory cradle or frame 16 consisting of interconnected side bars and cross bars by means of adjustable brackets 17.

In order to provide a right or left hand pivot for the vibratory movement of the frame 16, each standard 5 has journalled in it a manually actuated shaft 18 having a pinion 19 which meshes with a rack 20 which carries a plunger 21 adapted to engage the inner race of a ball bearing 22 the outer race of which is fixed in a cross bar 17 of the vibratory frame 16, see more particularly Figure 5.

The base also has slidably mounted on it in the guide slots 4, end standards 23 which are fixed in their adjusted position by means of suitable fastening devices 24 in a similar manner to that in which the standards 5 are fixed in their adjusted positions. Each standard 23 has mounted on it at its upper end a pair of solenoids 25 with which cooperate the armatures 26 in the form of permanent magnets which are fixed to the vibratory frame 16 in any desired manner so that an alternating electric current will be created by the vibratory movement of the stationary frame.

The vibratory frame 16, see Figure 3, is provided with sets of rollers 27 mounted in brackets 28 which are adjustable longitudinally of the frame. The brackets are slidably mounted on the frame and provided with suitable locking devices to retain them in the positions to which they have been adjusted. The rotatable body or specimen to be tested 29 has its shaft mounted on the rollers 27. 30 designates a spring, one end of which is fixed relatively to a bracket at the upper end of a standard 23 and at its free end it is provided with a bracket 31 in which is journalled a roll 32. The purpose of the spring mounted rolls 32 is to prevent relative upward movement of the shaft of the rotatable body with respect to the rollers 27 during the revolution of the rotatable body. The machine is driven by means of an electric motor 33 mounted on the base and provided with a pulley 34 around which passes a belt 35 which also passes around a pulley 36, the shaft of which is connected with a drive shaft 37 having two universals 38, and the outer section of this shaft 37 is journalled in a bearing 44 fixed to the vibratory frame. The shaft 37 at its free end is provided with a driving member 40 having the pins 41 which enter openings in a flanged collar 42 which has a friction fit on the shaft of the rotatable body 29.

The driving member 40 is mounted on the section 43 of the drive shaft 37 and this shaft section is mounted in a journal bracket 44 fixed to the vibratory support 16. The driving member 40 is in the form of a calibrated disc which has two tapped holes 45, diametrically opposite each other and at the same radius from the centre of rotation. A screw 46 of known weight is fixed in one of these holes and the disc is balanced with the screw in fixed position. By removing this screw, an unbalance is created equal to the weight of the screw times its radius of rotation, and by fixing the screw in the other tapped hole 45, 180° opposite, an unbalance of twice such value is made.

By means of these known quantities of unbalance, the electric meter, which will be hereinafter explained, can be easily calibrated.

The drive shaft 37 has a gear 46 fixed to it and this gear meshes with a gear 47 on a shaft 48 mounted on a bracket 49. The shaft 48 drives a commutator having an insulating collar 50 which carries two conducting rings 51 and 52. The ring 51 is electrically connected with a segment 53, and the ring 52 is electrically connected with a segment 54. Each of these segments are substantially 180° apart except for the necessary insulation between them. A brush 55 contacts with the ring 51, and a brush 56 contacts with the conducting ring 52.

57 designates a commutator shaft mounted in the bracket 49 and in threaded engagement with a brush holder 58 of insulating material. The holder 58 has two sets of brush carriers, each set consisting of two brushes spaced 180° apart, and with the brushes of one set spaced 90° from the brushes of the other set. One set consists of the conducting posts 59 and 60 having the brushes 61 and 62 respectively. The other conducting posts 63 and 64 have respectively the brushes 65 and 66. These brushes ride on the semi-circular segments 53 and 54, which latter are retained in position on insulated hub 50 by screws 111 and held on driving spindle 48 by the insulated washer 67 and the fastening device 68.

The holder 58 has spaced conducting rings 69 and 70.

The conducting post 59 is connected by a conductor 71 with a contact 72. The conducting post 60 is connected by a conductor 73 with a contact 74. The conducting post 63 is connected by a conductor 75 with a contact 76, and the conducting post 64 is connected by a conductor 77 with a contact 78. The brush holder 58 has secured to it a spring contact 79 normally engaging the contact 76 and connected by a conductor 80 with the conducting ring 69. The brush holder 58 has also secured to it a spring contact 81 normally engaging the contact 78 and connected by a conductor 82 with the conductor ring 70. The switch formed by the contacts 72 and 74, the contacts 76 and 78, and the spring contacts 79 and 81 is controlled by a push rod 83 of insulating material and has its free end slotted or recessed so that it can pass by the contacts 76 and 78 and move the switch members formed by the spring contacts 79 and 81 out of engagement with such contacts 76 and 78 and into engagement with the contacts 72 and 74.

The rod 83 passes through an angle indicating disc 84 graduated in degrees and extends into the brush holder 58. 85 is a stationary pointer, see Figure 1. A brush 86 cooperates with the conducting ring 69 and a brush 87 cooperates with the ring 70. The driving shaft 37 has fixed to it an angle indicating disc 88.

Referring now to the wiring diagram in Figure 12, the solenoids 25 have a common lead 89 leading to the brush 55. The solenoids 25 at the left hand end have a line 90 leading to a contact 91 of a double throw switch 100 having a contact 101 paired with the contact 91 and having a contact 102 paired with a contact 103, the latter being connected by line 104 with the solenoids at the right hand end of the machine. The contacts 101 and 102 are connected by line 105 with the brush 56. The brush 86 is connected by line 106 with one terminal of a direct current meter 107, and the other terminal of said meter is connected by line 108 with the brush 87.

The universal joint drive for the body to be tested is always properly aligned as one section of the drive shaft is journalled on the vibratory support which is free to vibrate. 109 is the switch for the motor 33 and is mounted on a table 110.

The body to be balanced is placed on the bearings of the vibratory support and driven by means of an adapter in the form of a driving member 42 which receives the spindle or trunnions of the body and is engaged by the pins 41 of the driving disc 40. One of the shafts 18 is now actuated to lock the vibratory support at one end and form a fixed pivot for the vibratory support, and the other shaft 18 is actuated to unlock the other pivot, so that one end of the vibratory support is free to vibrate.

If the body is out of balance at any point except in the plane of its pivot, such unbalance will cause a forced vibration of the support having the same frequency as the revolutions per minute at which the body is revolved.

The vibrations of the support and the magnets 26 generate an alternating electromotive force, the magnitude of which is in proportion to the amplitude of vibration, and the phase relation to the driving spindle will be dependent on the angular location of the unbalance. The alternating current is integrated.

By adjusting by rotation of the disk 84 the brushes which are in contact with the commutator until the commutator changes the direction of the current just when the electromotive force is zero, the D. C. meter connected with the brushes will indicate a maximum deflection. On account of the small value of the electromotive force at this point, a substantial change of brush position will result in a relatively small change of the meter hand deflection and thus the angular position of the brushes is not very definite.

If the other pair of brushes which are displaced 90° from the first pair are connected with the meter by pushing inwardly the push rod 83 of the switch, the meter should read zero as the commutator splits up the A. C. cycle into two halves which counteract each other on the D. C. meter. As this second set of brushes will change the direction of the current when the electromotive force generated in the coils is maximum, a slight change in the position of such brushes will result in a larger deflection of the meter hand than the same change of the other pair of brushes. It will thus be seen that by utilizing the 90° displaced brushes a very accurate and definite position of the brushes can be determined and also the phase angle of the A. C. current generated which depends upon the angular position of the unbalance.

The angle of unbalance is read on the graduated angle indicator disc 84 and after stopping the machine is referred to the body being balanced by means of the graduated disc 88 fixed to the driving shaft 37, so that the angle of unbalance can be accurately marked on the body for correction.

The magnitude of unbalance is in direct proportion to the maximum reading on the D. C. meter. The meter can thus be calibrated to read ounce inches of unbalance by determining the reading for one known quantity of unbalance on the vibratory support.

The calibration can be readily accomplished by use of the balanced calibrating disc 40 on the shaft 37. The screw 45 is of known weight, and, when removed from the hole 45 in which it was fixed when the disc was balanced, an unbalance equal to the weight of the screw times its radius of rotation is created. If the screw is fixed in the opposite hole 45 the value of unbalance is doubled.

By means of these known quantities of unbalance the meter can be easily calibrated.

The amount of unbalance in the specimen is determined in a novel manner since its value is determined by the amplitude of the movement of the vibratory frame which is in a direct proportion to the magnitude of unbalance. This movement of the frame actuates the magnet 26 as a movable core in the two stationary coils 25. It is immaterial whether the coils are carried by the frame or the magnet, it simply being necessary to obtain relative movement between the magnet and the coils, as is apparent.

The electrical current induced in the coils by the vibratory movement of the frame is registered on the electric meter 107. This current varies according to the amplitude and movement of the vibratory frame 16 which in turn is dependent on the amount of unbalance in the rotatable body. The current registered on the meter for a selected plane of correction is therefore varying according to the amount of unbalance in the body being tested for unbalance.

Through the entire balancing operation the machine is run at a constant speed and the natural periods of vibration of the balancing frame are varied by mechanical means incorporated in the machine. The rods have a different degree of resistance and different resiliency in various angular directions and by turning the rods in different angular positions, various critical periods of vibration may be obtained. The turning of the rods is accomplished by the hand levers 11 at each end of the machine while the machine is running and varies the amplitude of vibration.

The handle 11 that operates the rods at the free end of the machine is now turned until the desired amount of electric current is registered on the electric meter indicating the amount of unbalance at the end of the body which is being tested. For consistent and reliable unbalance readings it is desirable to adjust the natural period of vibration so far from the resonant or critical period either above or below, that the effect of small speed variations of the driving motor is negligible. When it is desired to indicate infinitely small quantities of unbalance the machine may be adjusted to the resonant or critical period.

Referring now to the wiring diagram seen in Figure 12, when the left hand end of the body is to be tested for unbalance the switch 100 is moved to the left to engage contacts 91 and 101. Line 89 from coils 25 at the left hand end of the machine leads to brush 55, conducting ring 51 and commutator segment, 53 or 54. Line 90 leads from the same coils through contact 91 switch lever 100, and line 105 to brush 56, ring 52 and commutator segment 54 or 53.

When the switch arm 100 is moved toward the right, the coils 25 at the right end are connected by line 89 with brush 55, ring 51, and commutator segment 53 or 54, and by line 104, contact 103, contact arm 100, contact 102, line 105, brush 56, and ring 52 with commutator segment 54 or 53.

The switch members 79 and 81 are normally in contact with contacts 76 and 78 but when the switch rod 83 is pushed inwardly they move into engagement with contacts 72 and 74. The angle of unbalance is determined by turning the brush holder until the meter reads approximately maximum, then pushing rod 83 inwardly and adjust the brush position closely until the meter reads zero. When this adjustment is finished release rod 83 and meter will show the maximum reading indicative of the magnitude of unbalance.

The readings for the amount of unbalance and the angle of unbalance are taken in a similar manner for the right hand end of the rotatable body and a detail description is therefore unnecessary.

The body can thus be tested in two planes of correction, and the proper corrections made to place the body in dynamic balance. The coils 25 at each end are so connected that the electromotive force generated is cumulative.

Having thus described my invention what I claim as new and desire to secure by Letters Patent, is:

1. In a balancing machine, means to revolve a body to be tested, means to translate vibrations, due to unbalanced forces in the body, into alternating current, a commutator means to which such current is conducted, means to revolve said commutator means at a definite speed relatively to that of said body, means to reverse the direction of the alternating current at half cycle intervals, a direct current meter, means for electrically connecting said meter with said reversing means to determine from the value of the reading of the meter the phase angle of unbalance of said body.

2. In a balancing machine, a vibratory support, means to revolve a body thereon, means responsive to vibrations of said vibratory support to create an alternating electromotive force due to unbalanced forces in said body, a commutator means electrically connected with said force and having sets of brushes, with one set circumferentially spaced from another set, means to drive said commutator means at a fixed speed relatively to said body, a direct current meter, and means for electrically connecting said meter at will of the operator with a selected set.

3. In a balancing machine, a vibratory support, means to revolve a body thereon, means responsive to vibrations of said vibratory support to create an alternating electromotive force due to unbalanced forces in said body, a commutator means electrically connected with said electromotive force and having two sets of brushes, means to drive said commutator means at a fixed speed relatively to said body, a direct current meter, means for electrically connecting said meter at the will of the operator with one or the other of said sets, and a rotatable angle indicator connected with said brushes to visibly indicate the angle of unbalance.

4. In a balancing machine, a vibratory support, means to revolve a body thereon, means responsive to vibrations of said vibratory support to create an alternating electromotive force due to unbalanced forces in said body, a commutator means electrically connected with said electromotive force and having two sets of brushes, means to drive said commutator means at a fixed speed relatively to said body, a direct current meter, means for electrically connecting said meter at the will of the operator with one or the other of said sets, an angle indicator fixed to said sets to indicate the angle of unbalance, and an angle indicating member for said body revolving means to facilitate the marking of the angle of unbalance on the body.

5. In a balancing machine, means to generate an alternating current by the action of unbalanced forces in a revolving body, a commutator means connected with such current, contacts insulated from each other, a rotatably adjustable brush holder having sets of brushes circumferentially spaced from each other and cooperating with said contacts, an angle indicator fixed to said brush holder, a direct current meter and means for electrically connecting said meter with said brushes.

6. In a balancing machine, a vibratory support, means to revolve a body thereon, means responsive to vibrations of said support to create an alternating electromotive force due to unbalanced forces in said body, a commutator means rotatable in synchronism with the body and electrically connected with said electromotive force, and having two sets of brushes positioned at predetermined angles relatively to each other, a direct current meter, and means to selectively connect said meter with one or the other of said sets of brushes.

7. In a balancing machine, a vibratory support, means to revolve a body thereon, means responsive to vibrations of said vibratory support to create an alternating electromotive force due to unbalanced forces in said body, a commutator means electrically connected with said force, and having sets of brushes, means to change the angular relation of said commutator means and said sets of brushes, a direct current meter, and means to selectively connect said meter with a selected set of brushes.

8. In a balancing machine, a vibratory support, means to revolve a body thereon, means to translate vibrations due to unbalanced forces in said body into alternating current, means to reverse the direction of the alternating current at half cycle intervals, means to time said reversing means in relation to the phase angle of said alternating current, and means to measure the output from said reversing means.

9. In a balancing machine, a vibratory support for a rotatable body to be tested, means operatively connected with said body to revolve it at a constant speed, means to translate the vibratory movement of said support into alternating current, means to rectify said alternating current, and means to measure the current created and thereby indicate the amount of unbalance said measuring means also including means to directly indicate the angular location of unbalance.

10. In a balancing machine, a vibratory support for a body to be tested, means operatively connected with said body to revolve it at a constant speed, a coil and a magnet mounted for relative movement caused by vibratory movement of said support to thereby create an alternating electric current, means to integrate said alternating current, and a direct current meter to measure the resultant amount of current created and thereby the amount of unbalance of the body.

11. In balancing apparatus, means to generate by the action of unbalanced forces in a rotatable body an alternating electromotive force which is in proportion to the amplitude of vibration of the revolving body and the phase relation of which is dependent upon the location of the unbalance, means to integrate said electromotive force and to determine the angular limits of said integration, and means to measure the integrated current and thereby determine the amount and angular location of unbalance.

BENGT ERIK OHLSON.